(12) United States Patent
Clarke

(10) Patent No.: US 7,062,453 B1
(45) Date of Patent: Jun. 13, 2006

(54) METHODS AND SYSTEMS FOR A DYNAMIC NETWORKED COMMERCE ARCHITECTURE

(75) Inventor: Heath B. Clarke, Newport Beach, CA (US)

(73) Assignee: Interchange Corporation, Irvine, CA (US)

( * ) Notice: Subject to any disclaimer, the term of this patent is extended or adjusted under 35 U.S.C. 154(b) by 909 days.

(21) Appl. No.: 09/653,095

(22) Filed: Aug. 31, 2000

Related U.S. Application Data

(60) Provisional application No. 60/151,872, filed on Aug. 31, 1999.

(51) Int. Cl.
*G06F 17/60* (2006.01)

(52) U.S. Cl. .......................................... 705/26; 705/37

(58) Field of Classification Search ................... 705/14, 705/26, 27, 37; 707/10; 345/353
See application file for complete search history.

(56) References Cited

U.S. PATENT DOCUMENTS

| | | | | |
|---|---|---|---|---|
| 5,794,210 | A | | 8/1998 | Goldhaber et al. ........... 706/14 |
| 5,926,798 | A | * | 7/1999 | Carter .......................... 705/26 |
| 5,963,924 | A | | 10/1999 | Williams et al. .............. 705/40 |
| 6,029,141 | A | * | 2/2000 | Bezos et al. .................. 705/27 |
| 6,076,070 | A | | 6/2000 | Stack ........................... 705/20 |
| 6,185,541 | B1 | * | 2/2001 | Scroggie et al. .............. 705/14 |
| 6,256,028 | B1 | * | 7/2001 | Sanford et al. ............. 715/841 |
| 6,260,024 | B1 | * | 7/2001 | Shkedy ......................... 705/37 |
| 6,286,002 | B1 | * | 9/2001 | Axaopoulos et al. ......... 707/10 |
| 6,336,099 | B1 | * | 1/2002 | Barnett et al. ................ 705/14 |

FOREIGN PATENT DOCUMENTS

EP     0 717 343 A1  *  6/1999

OTHER PUBLICATIONS

"Best free stuff online"; Harry McCracken; PC World, San Francisco; Jun. 1999.*
PR Newswire Association, Inc., Big Planet Launches Portal with Looksmart; 'Next Generation' Portal Posts 800, 000 Site Listings in 24,000 Categories, Feb. 18, 1999.
PR Newswire, MSNBC on Internet Launches MSNBC Personal Toolkit, Apr. 2, 1997.
Business Wire, Twentieth Century & Benham Group Launch Mutual Fund Web Site Featuring Online Trading Capabilities, Sep. 9, 1996.
Karmes, Clifton, Two Power Apps that Won't Break the Bank, Compute, vol. 13, No. 7, p. 60, Jul. 1991.
PCT International Search Report. mailed Jan. 3, 2001.

* cited by examiner

*Primary Examiner*—Wynn W. Coggins
*Assistant Examiner*—R. E. Rhode, Jr.
(74) *Attorney, Agent, or Firm*—Van Pelt, Yi & James LLP

(57) ABSTRACT

One embodiment of the present invention provides systems and methods, which allow a more efficient shopping experience. A cascading commerce menu provides access to a plurality of product, service, and/or content categories. In one embodiment, the cascading commerce menu is stored on a client computer, thereby providing quick access to the menu.

15 Claims, 14 Drawing Sheets

Products: 1–4 of 4 matching "Sony Corp of America 17" monitors".  /— 300

| Manufacturer | Model# | Rating | Last Updated | Stock | State | Price | Shipping | Total | One Click! |
|---|---|---|---|---|---|---|---|---|---|
| Sony | cpd200es | ***** | 6-30-99 | 24 | NY | 329.95 | 40.00 | 369.95 | buy now |
| | The Sony CPD-200ES provides the budget-conscious computer user a better option over monitors based on shadow mask CRT technology. This entry level 17" computer display (16" VIS) provides features normally found on high-end Sony Computer displays, including the crispness of Sony's legendary... | | | | | | | | |
| Sony | cpd200es | **** | 7-7-99 | 15 | CA | 425.75 | 20.00 | 445.75 | buy now |
| | No description available. | | | | | | | | |
| Sony | cpd200gs | ***** | 7-2-99 | 5 | WA | 575.00 | 30.00 | 605.00 | buy now |
| | The Sony cpd-200vs The Sony CPD-200GS provides the demanding corporate user an elegant solution for both sight and sound. By incorporating Sony's legendary Trinitron technology, now with Digital Dynamic Convergence™ Control, and Corporate Audio speaker, the GS series is the best... | | | | | | | | |
| Sony | cpd200vs | ***** | 6-15-99 | 30 | CA | 775.00 | FREE | 775.00 | buy now |
| | The CPD-220VS multimedia display combines the world-famous hi-fi, 3D sound of Sony home audio systems with the superior, award winning image quality of Sony Trinitron CRT Technology. The result is a sharp, clear, 17" display (16.0" viewable image size) with outstanding sound. Sony Digital Multiscan... | | | | | | | | |

| FIG. 5A |
|---|
| FIG. 5B |

FIG. 5A

/—500 ePilot
- Download Now!
- How Much Money?
- Press Room
- Referral Center *New!*
- Questions?
- Webmaster Earn Money

*ePilot* / *Get paid to surf the web...*

☐ Adult sites must check this box. (Your site won't be listed otherwise.)

ePilot
Download Now!
How does it work?
How much money?
How to download?
Referral Center
Report a Bug

Promote Your Site
Advertising Info
Pay-per-click
Banner ad info
Webmasters

Info
FAQs
Terms & Conditions
The Company
Privacy Policy
Antispam Policy
Press Room Advertisement Advertisement Please enter the relevant sub-menus in 1Navigator for which you want to be listed. You may enter additional sub-menus to receive more exposure. Additional sub-menus allow your text listings to show up when users click on the sub-menus you have selected. Also enter a "bid" price for each text listing. Bids are the amount of money you will pay eLiberation.com when a user clicks on your listing.

Remember you only pay for actual click-throughs to your site!

1. Category ~506 ePilot Sub-menu (e.g. leather sofa)
[            ]~508

Current Advertiser's Bid
[0.13]~510 ePilot Sub-menu (e.g. sofa)
[            ]

additional ePilot Sub-menu (e.g. furniture)
[            ]

ePilot Sub-menu (e.g. sofa shop)
[            ]

URL: (e.g. http://www.xyz.com)
[http://    ]

Bid (US $):
(e.g. 0.09=9 cents, 0.90=90 cents)
[0.00]

502    504

2.

ePilot Sub-menu (e.g. leather sofa)
[            ]

ePilot Sub-menu (e.g. sofa)
[            ]

additional ePilot Sub-menu (e.g. furniture)
[            ]

ePilot Sub-menu (e.g. sofa shop)
[            ]

URL: (e.g. http://www.xyz.com)
[http://    ]

Bid (US $):
(e.g. 0.09=9 cents, 0.90=90 cents)
[0.00]

3.

ePilot Sub-menu (e.g. leather sofa)

ePilot Sub-menu (e.g. sofa)

ePilot Sub-menu (e.g. furniture)

ePilot Sub-menu (e.g. sofa shop)

URL: (e.g. http://www.xyz.com)
http://

Bid (US $):
(e.g. 0.09=9 cents, 0.90=90 cents)
0.00

4.

ePilot Sub-menu (e.g. leather sofa)

ePilot Sub-menu (e.g. sofa)

ePilot Sub-menu (e.g. furniture)

ePilot Sub-menu (e.g. sofa shop)

URL: (e.g. http://www.xyz.com)
http://

Bid (US $):
(e.g. 0.09=9 cents, 0.90=90 cents)
0.00

FIG. 5B

METHODS AND SYSTEMS FOR A DYNAMIC NETWORKED COMMERCE ARCHITECTURE

RELATED APPLICATION

This application claims the benefit under 35 U.S.C. § 119(e) of U.S. Provisional Application No. 60/151,872, filed Aug. 31, 1999, the entirety of which is hereby incorporated by reference.

BACKGROUND OF THE INVENTION

1. Field of the Invention

The present invention is related to facilitating commerce, and in particular, to marketing goods and services over a network.

2. Description of the Related Art

Conventional e-commerce sites and catalogs provided over the Internet are often slow and cumbersome, providing an unpleasant shopping experience. For example, if a purchaser wants to buy a specific product or type of product, the purchaser might have to click through many pages until locating the desired product. Moreover, while conventional e-commerce sites might provide a ranked list of several suppliers for a given product, the list ranking is typically based solely on the price of the product itself. Furthermore, conventional e-commerce sites typically feature data driven web sites that can only display product offerings through a web page downloaded to a standard browser.

SUMMARY OF THE INVENTION

The present invention relates to systems and methods for providing an intuitive, easy to use, cascading menu system that can advantageously simplify e-commerce transactions. The cascading menu system is further dynamically generated from a simple and compact text file that is quickly downloaded and easily updated. A user of the cascading menu can thereby quickly access products and services even where the user's access to a network, such as the Internet, is relatively show.

An embodiment of the present invention provides a user with a cascading menu. The cascading menu is dynamically generated using a program language such as visual basic, from a text file that specifies parameters of the cascading menu. The cascading menu can automatically provide sub-categories such that a user can easily locate desired products and services. For example, a cursor can float over a menu item or the user can click on a menu item and the system can respond with a further sub-classification of the menu item. The text file can be stored locally on a user's machine such that upon subsequent accesses, the menu can be updated with relatively small changes to the text file as opposed to a download of the entire text file.

The selecting of objects and searches from the cascading menu can earn the user credits or micro-credits. The credits can be applied to purchases from a provider of the cascading menu. Advantageously, the credits from the provider can avoid or reduce transaction costs, which can undermine the economic feasibility of small quantity or low cost transactions.

Selection of a menu item can activate a search by a commerce server. In one embodiment, the search or search activation can also earn the user credit or micro-credit. The search by the commerce server can return a web page of items conforming to the products or services indicated by the menu item. For example, where the menu item corresponds to 17-inch computer monitors, the web page can return a list of available 17-inch monitors from a variety of vendors.

The web page can advantageously rank or arrange goods or services in an order of aggregate cost. The commerce server can combine a bare product cost with additional costs, such as shipping, handling, insurance, and sales tax, and the commerce server can account for disparities in additional costs by locale by accessing a database containing the user's shipping address. In one embodiment, the commerce server provides an online bidding system such that a vendor can change the vendor's bare product cost or additional cost to change the vendor's ranking within a web page.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

FIG. 3 illustrates an embodiment of a ranking display;

FIG. 5 consists of FIGS. 5A and 5B and illustrates one embodiment of a bid form menu;

DETAILED DESCRIPTION OF THE PREFERRED EMBODIMENTS

The present invention is directed to novel methods and systems for enhancing commerce over a network, such as the Internet. One system according to an embodiment of the present invention uses a client-side application that is optionally highly integrated with a server-side application. In the system, the client-side application and the server-side application share a configuration and a personalization data, so that selections and preferences made through the web site are substantially transparently reflected in the client-side application. In this embodiment, integration of a highly interactive client with a similarly highly personalized server with stores of personal, credit, and accounting data, creates a highly functional Internet Commerce Framework. The Internet Commerce Framework allows portability of an individual user's preferred commerce environment among a number of different computer terminals, systems and computer-based clients allowing the user to experience a familiar, customized environment on a variety of terminals. The client systems can be personal digital assistants, network enabled televisions, phones with displays, or other types of computers, such as desktop computers, which can include monitors, keyboards, pointing devices, network interfaces, and the like. The client systems can also be completely different physical machines running the same operating system, such as an office PC and home PC. The shared Internet Commerce Framework makes the commerce experience nearly the same, if not identical, on all systems.

A novel menu system according to one embodiment of the present invention is organized to allow a purchaser to swiftly locate a desired product or service. The menu system utilizes a cascading commerce menu structure that can provide rapid location of a vast number of products, services, and other content. For example, 64,000,000 or more categories of content product and services can be accessed via one cascading menu. The menu is presented to a user, such as a consumer or client, on a client computer terminal or display.

Figure 1:
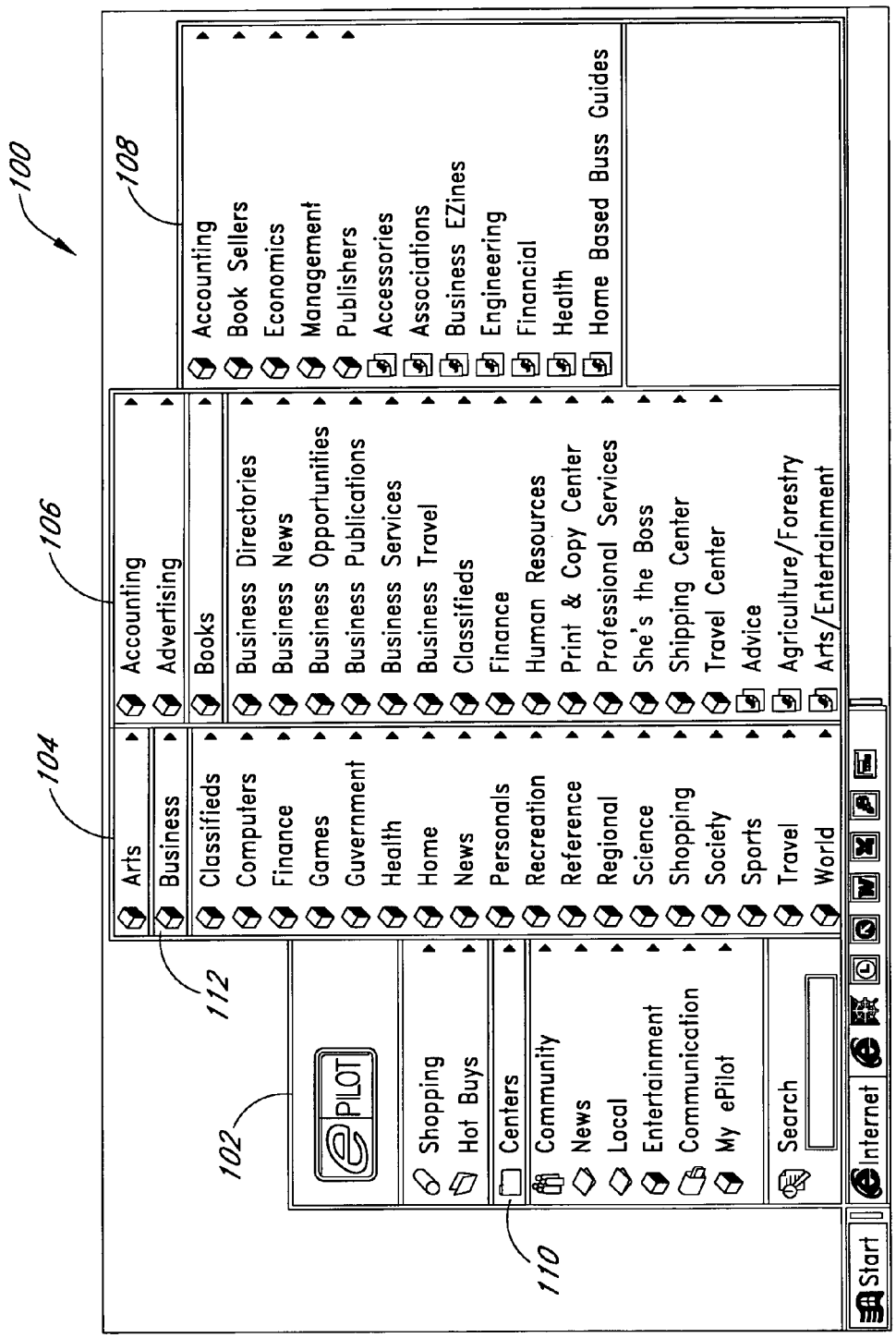
FIG. 1 illustrates a first embodiment of a cascading commerce menu.

FIG. 1 illustrates one such exemplary cascading commerce menu 100. The cascading menu can contain a top-level menu 102 that lists a first high-level set of product, service, and/or advertising categories, and a series of descending sub-menus 104, 106, 108, where each sub-menu further defines the product, service, and advertising categories into more detailed subcategories. In the example illustrated in FIG. 1, the top-level menu 102 categories include shopping, hot buys, information centers, and so on. The next level or submenu 104, which descends from the Centers category 110, includes the further categories of arts, business, classifieds, etc. The next cascading menu 106, which descends from the Business category 112, lists still more refined categories, such as accounting, advertising, books, and so on.

In one embodiment, one or more of the category listings can represent a hyperlink to the desired content, which can be located on a server, such as a server in the World Wide Web, that is connected to a network, such as the Internet or some other network. Advantageously, the use of the cascading commerce menu is intuitive, which minimizes the consumer learning process.

In another example that is not illustrated, a cascading commerce menu can be associated with a commerce facilitator or provider. A top-level menu can list a number of product and service categories, such as travel, computer equipment, music, clothing, entertainment, jewelry, and so on. A consumer interested in computer equipment can place a cursor over the computer equipment listing. A first submenu can then appear alongside the top-level menu in a cascading manner. The first submenu can list a set of computer equipment categories, such as monitors, storage devices, communication devices, printers, scanners, cables, and so on. If, for example, the consumer places the cursor over the storage device listing, a second submenu may appear alongside or in place of the first submenu. In one embodiment, the consumer does not have to click to bring up the first submenu. In another embodiment, the consumer does click to bring up the first submenu.

The second submenu may list a still further refined set of storage device categories. The storage device categories may include, for example, hard drives, floppy drives, CD-ROM drives, CD-RW drives, DVD drives, and so on. If, for example, the consumer then places the cursor over the CD-RW drive listing, a third submenu may appear alongside or in place of the second submenu.

The third submenu can list a further refined set of CD-RW drive categories. The CD-RW drive categories may include, for example, SCSI CD-RW drives, USB CD-RW drives, and parallel port CD-RW drives. If the consumer then places the cursor over the CD-RW drive listing, a fourth submenu may appear alongside or in place of the third submenu.

The fourth submenu can list a still further refined set of USB CD-RW drive categories. The CD-RW drive categories can include, for example, USB CD-RW drives between $100–$200, USB CD-RW drives between $200–$300, and USB CD-RW drives between $300–$400. When the consumer then places the cursor over the CD-RW drives between $200–$300 listing, a fifth submenu can appear alongside or in place of the fourth submenu. The fifth submenu can list the manufacturer's name and the model number of all CD-RW drives costing between $200–$300. If the consumer clicks on a given desired model listing, the consumer can be hyperlinked to a catalog page providing information about the selected model and a ranked listing of distributors or providers selling the desired model. The ranked listing will be discussed in greater detail below. In one embodiment, the hyperlink is to a site located across a network, such as an Internet site. Of course, the number of submenus is not limited to five. A greater or lesser number of submenus may be used for each product category, depending on how many refined or specific subcategories or desired. In addition, the click operation may be performed using a mouse, trackball, touch pad, key, voice command, or the like.

In another example, where the consumer desires to purchase a pair of black shoes costing between $20 and $40, the consumer can position a cursor over a shopping category listing on a top-level menu containing, for example, shopping, travel, entertainment, restaurants, and news categories. The user can then descend through cascading menus to select the desired good. For example, the consumer can follow the path:

shopping->clothing->footwear->dress shoes->$20–$40->black color and so on, where the symbol "->" represents the act of proceeding to the next submenu. The cascading menu structure can be used to create complex search strings with minimal effort on the part of the user or consumer. In one embodiment, the search string generation is transparent to the consumer. Upon a click of the mouse, the search string can be transmitted over the Internet to a commerce server, which in turn provides the search results.

Thus, a consumer can quickly locate a desired item by moving a cursor and then, with a single click or other activation, retrieve information about the item and have the opportunity to purchase the item. By contrast, a conventional system can require the consumer to laboriously click through page after page of information, each separately transferred over the Internet, until the desired item is located. In one embodiment, the information needed for a transaction, such as a consumer's name, address, and credit card number, has been stored in a record in a database through a registration process, and the customer is associated with the record through a login process. Since the system can retain the consumer's information, a single click on a purchase icon can place the order and charge the consumer for the order, thereby reducing or eliminating the need for a lengthy purchase process.

One embodiment of the present invention includes integration with a client application, which operates as a container for functional components or modules. The functional components can be integrated with corresponding server-side components or modules of the server application. For example, the functional component can allow a user to earn a reward or credit toward a purchase on a pay-per-click basis. For example, a reward can include money, a coupon, a discount, a credit, a free product or service, frequent flier miles, and the like. As a user browses through, for example, an online catalog, the user can earn a reward, credit, or micro-credit, which can be accumulated in an account. In one embodiment, the user can apply or spend the earned credit only to purchases made through the server application where the credit was earned. In another embodiment, the user can spend the earned credit in multiple systems associated with multiple vendors. The accounting of credit and expenditures thereby allows a client and a server component pair to represent unique encapsulated commerce or Internet functionality. For instance, the cascading commerce menu system, as detailed above, can be linked to a dynamic menu generation server module, which can indicate an amount of credit in a user's account and items that can be paid for, either partially or in whole, with the credit.

Another functional component of the system can include a client-side user authentication module and the personalization and profiling server-side module, which is used in a result ranking system described in connection with FIGS. 2 and 3. The client-side components and server-side components can be assembled in a custom configuration to develop customized solutions that feature some or all of the unique commerce system functionality.

In one embodiment, the consumer does not need to be linked to the supplier's site during the product selection and purchase process. Rather, the product selection and purchase process for the thousands or millions of items available via the cascading commerce menu can be conducted at a single site that acts as a catalog. The single site contains the product information, prices, aggregate costs, supplier information, and so on. The consumer can thereby avoid having to visit different sites with unfamiliar interfaces of varying degrees of reliability, and avoid having to disclose private financial data in multiple places.

In one embodiment, the single site further includes a data store with a consumer's or user's personal data, i.e., credit card data, email address, preferred shipping method and preferred shipping address, together with a user's transactional account balance. The transactional balance is an accumulation of the user's micro-credits minus the user's expenditures of micro-credits. Micro-credits can be accrued in exchange for viewing a search page. A micro-credit can be accumulated to the user's transactional balance on a pay-per-click basis. A micro-credit can be related to a monetary value and expended upon, for example, a low-value online purchase or a viewing of pay-per-use content.

In one example, a user can navigate through a cascading commerce and receive a credit or micro-credit in exchange for initiating the search or for viewing the search results. An example of a screen display that illustrates the results of a sample search is shown and described in connection with FIG. 3. In one embodiment, the credit is accumulated in small increments, such as a few cents or even a fraction of a cent. A database in a commerce server can maintain a balance of the credit in a user's account.

Gradually, the user accumulates enough micro-credit to make purchases or receive discounts on purchases for services and goods. For example, the user can apply the credit accumulated to the purchase of a low cost item, such as a downloadable music-single, which is typically available in a "wav" or "mp3" format. A downloadable music-single can sell for a relatively low value, such as 99 cents. Economically, the transaction costs of conventional money systems to both the user and a vendor associated with a low cost product or service can render such a low value transaction unfeasible. For example, in a traditional money system, the user enters in name, address, credit card information, and the like. The time consuming transaction cost to the user is thereby high relative to the benefit enjoyed by the user. Similarly, the vendor checks credit and incurs significant credit card transaction fees from a merchant bank. The transaction fees thereby grow in relation to the cost of the product or service.

With micro-credit, the price associated with the music-single can then be deducted from the user's account to "pay" for the music-single. In one embodiment, there is no actual money exchanged such that the user does not have to enter credit information, such as a credit card number, and the vendor can avoid credit card transaction fees.

A micro-payment commerce system can advantageously allow users and vendors to conveniently conduct micro-commerce. The micro-payment commerce system incurs relatively low transactional costs such that low-value goods, such as an 80-cent book, can be efficiently offered to the consumer. Traditional e-commerce systems incur relatively large transactional costs, such as credit card transaction fees and accounting overhead, which inhibit the ability for a traditional e-commerce system to offer low-value goods and services.

In one embodiment, the cascading commerce menu is created from text files downloaded or streamed from the application server. The text files indicate the content of the cascading commerce menu, which is then dynamically generated from the text files. Thus, even a menu listing millions of items does not utilize an inordinate amount of disk or RAM space. Furthermore, the menu can be downloaded to the consumer's client computer from a web site associated with an operator of the commerce site, which manages the menu. Because the menu is text driven, the menu can be quickly downloaded even at a relatively slow 28 Kbaud modem speed. In addition, a portion of the menu can be quickly updated with new categories and/or items each time the consumer uses the system or on a predetermined periodic basis set by the menu provider or by the consumer.

Because one embodiment of the cascading commerce menu is stored on the client side, that is, on the consumer's computer or terminal, access to each submenu appears almost instantaneous to the user with a corresponding movement of the cursor. This contrasts to a conventional web page, where typically the product categories are stored on the server, and each new category or subcategory search requires communication over the Internet to download a new web page.

In another embodiment, the cascading commerce menu may be customized for or by a consumer to reflect the consumer's preferences. For example, upon registering with the commerce site associated with the commerce menu, the consumer may indicate an interest is certain categories, such as computers, music, and Scotch. The top-level menu can be modified so as to include these categories for quick access. Similarly, the consumer may indicate a lack of interest in one or more categories, and these categories can be removed from the top-level menu. The removed categories can either be grouped under a different top-level category, such as a "Miscellaneous" category, or can be removed from the menu structure altogether.

In addition, in one embodiment, the consumer may be able to directly add, delete, or move categories or web site links. This type of consumer modification may be accomplished, by way of example, by dragging the category or item from a given level of the cascading menu to a different location or level on the cascading menu or off the menu altogether. In one embodiment, the modification may be performed by right clicking on the category or item using a right mouse button and then selecting from one of several options from a pop-up menu. These options may include deleting or moving the category or item. In one embodiment, these preferences are stored both on the consumer's computer and on the commerce provider's server.

The stored preferences on the commerce provider's server can be used to restore a consumer's preferences to another computer. In one example, a consumer may elect to access the commerce provider's server through a different computer, such as a friend's computer, that does not contain the consumer's customized cascading menu. In this situation, the consumer may logon to the commerce provider's web site and the commerce provider's server can download or relay the consumer's customized menu to the different computer. Thus, the consumer can be presented with the same interface and same commerce menu that the consumer is already familiar with, regardless of the computer used. As a result, the consumer can enjoy a much more efficient and pleasurable shopping experience.

In one embodiment, when a consumer registers to download the cascading menu, the consumer provides the consumer's address, including country, state, city, and/or zip code. As will be described below, this information may be advantageously used to provide the consumer with accurate pricing of goods and services. In addition, the consumer may provide a credit card number, which can be automatically retrieved for future purchases of items from the menu. Thus, once the consumer clicks on an item to be purchased, the consumer's card can be automatically charged and the address information can be provided to the supplier for shipping, which greatly eases the purchasing process. Furthermore, the consumer does not have to register with multiple suppliers. Instead, by registering once, the consumer can purchase items from a multitude of suppliers. Additionally, as previously described, the consumer can purchase items from all or many of these providers with a single click, though in other embodiments, multiple clicks may be used. Furthermore, warranty information related to the product purchased can be automatically filed on the commerce server or on the client's computer, thereby reducing or eliminating the need for the consumer to keep track of the warranty information.

A ranking system and method will now be described. In one embodiment, a real-time server-side software system ranks products on a supplier basis into an ascending or descending order based on at least one factor, such as aggregate price or cost. In one embodiment, aggregate price includes more than just the price of the product itself. Instead, the aggregate price may include other costs associated with the purchase of the product. Thus, the aggregate price can include the actual total cost to the consumer, and not merely the item or service cost. For example, the aggregate price can include a specific selection of costs, such as product cost, shipping costs, insurance costs, and/or taxes. The aggregate pricing can be used to arrange or rank products in a display. Advantageously, once the rankings are computed and displayed to a consumer, the consumer has a better understanding of the total costs for a purchase from a potential supplier. Merely because a supplier has the lowest product cost does not mean the supplier will have the lowest aggregate or overall cost. Thus, in one embodiment, having the lowest item price or product cost does not ensure a highest ranking, where products are ranked from lowest aggregate cost to highest aggregate cost.

The software system utilizes address information provided by the consumer to determine costs that may vary based on the location of the consumer relative to the supplier. For example, shipping costs and taxes can vary widely by location. Thus, an item ranking for an item can be different and customized for a first consumer located in a first location than an item ranking for the same item for a second consumer located in a second location. For example, where an item is relatively large, such as a refrigerator, a supplier located in the same city as the consumer may list a much lower delivery cost than a distant supplier located hundreds or thousands of miles away. Thus, even if the local supplier charges $10 more for the refrigerator than the distant supplier, the local supplier's aggregate cost, and hence the total cost to the consumer, may be much lower than the distant supplier's aggregate cost. Similarly, if the supplier is located in a different state then the consumer, there may be no sales tax, while an in-state transaction may incur a sales tax.

In one embodiment, the menu system displays additional information that can be relevant to a consumer's selection of a supplier. For example, the ranked list can include a satisfaction or performance ranking based on one or more inputs from previous purchasers from the supplier. Similarly, the size of the supplier, based on total previous gross sales, capitalization, and/or credit ratings can be provided as well. Thus, a consumer who also values high quality service can select a supplier based both on a combination of price and service, as well as other important factors.

Figure 2:
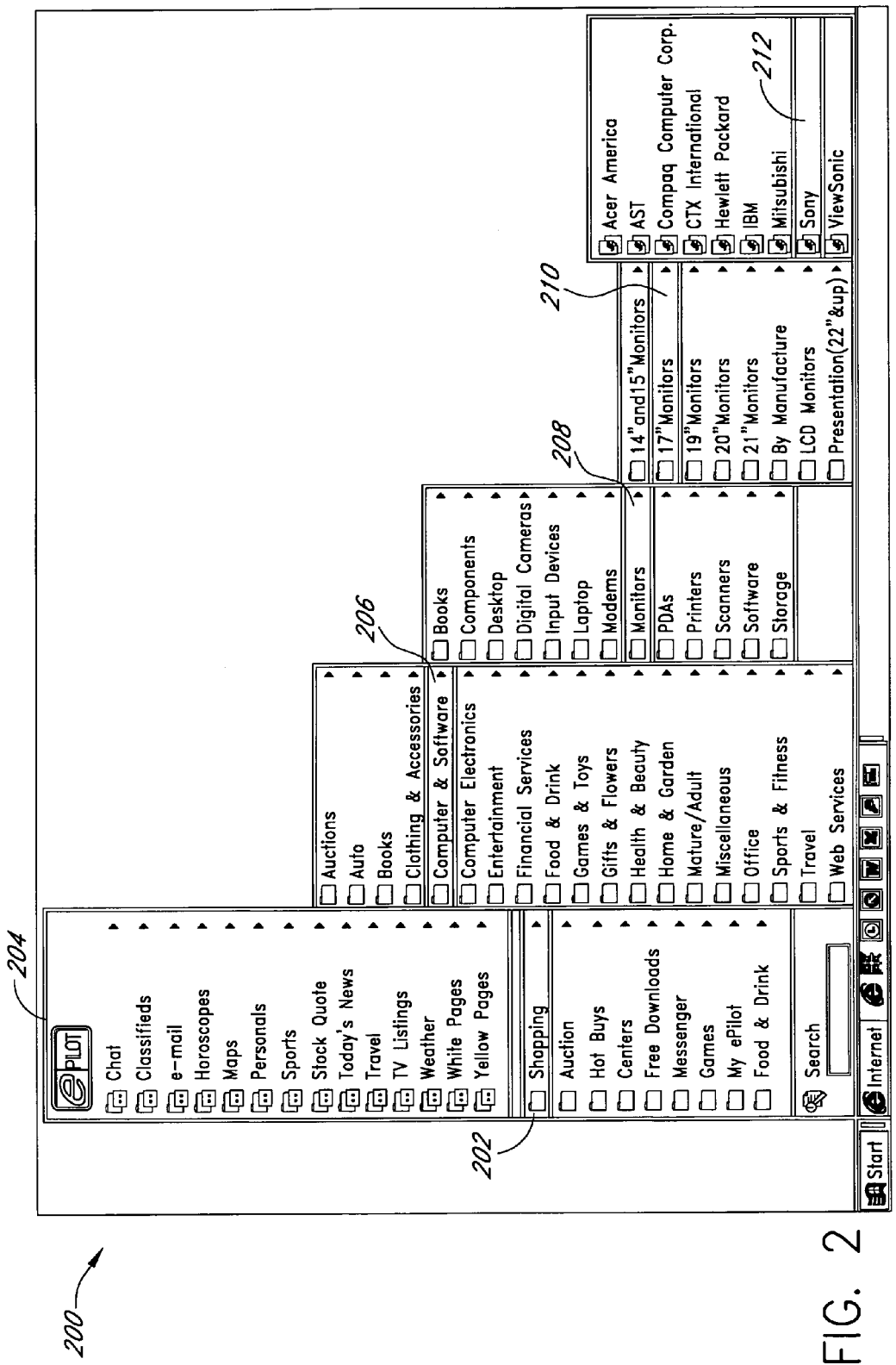
FIG. 2 illustrates a second embodiment of a cascading commerce menu.

FIGS. 2 and 3 illustrate exemplary screens, which may be displayed to a user during a typical selection and purchase process for a Sony® 17" computer monitor. A consumer uses a cascading menu 200, as illustrated in FIG. 2, and follows the path from a Shopping category 202 on the top-level menu 204, through a Computer & Software category 206, a Monitors category 208, a 17" Monitors category 210, to a Sony® 212 category. In one embodiment, the process of generating and displaying the cascading menus is performed on the client computer, without accessing the Internet. With one click on the Sony® category 212, a ranked list 300 of different suppliers of 17" Sony monitors is displayed as shown in FIG. 3. In one embodiment, the ranked list is dynamically generated and downloaded from a web server connected to the Internet.

The ranked list 300 includes the manufacturer's name 302, a small photograph 304 of the item, a model number 306, a satisfaction rating 308 by previous purchasers, a date 310 of the last update for the supplier, a number of items in stock 312, a state from which the item will be shipped 314, an item price 316, a shipping cost 318, a total or aggregate cost 320, and a purchase, or "Buy Now," 322 field. In one embodiment, a click on the "Buy Now" field 322 completes the purchase transaction. In another embodiment, clicking on the manufacturer's name 302 can bring up another screen providing more details as to the name, address, and other information related to the supplier. In another embodiment, the supplier information may be displayed on the same ranked list display.

In one embodiment, a product supplier is able to bid to have its ranking improved relative to rankings of competitors. For example, once a supplier registers with the cascading commerce menu provider, the supplier has the ability to add the supplier's name to the ranked list of suppliers. The supplier can, at essentially any time, view its competitors' prices for the same item, and bid to reduce one or more of the costs which go into the aggregate cost. Thus, the supplier can reduce the item price, delivery cost, and/or insurance costs to improve the supplier's ranking.

Once the supplier submits a bid or reduced cost, the server software can use the new cost data to automatically rank suppliers of the product in response to a consumer inquiry. If the supplier reduces one or more costs sufficiently so as to have the lowest aggregate cost, the supplier may achieve the top ranking for that particular product for one or more consumers.

In addition, the supplier can set limits on one or more of the reduced costs. For example, the supplier may have the reduced cost only apply for a given time period, or for a first number of units sold. Once the limit has expired, the price can automatically return to the original price or be replaced with a new price specified by the supplier.

In one embodiment, advertisers may bid or pay for advertising and/or hyperlink placements on one or more levels of the cascading commerce site. Furthermore, if there are several positions on a given menu, the highest bidder may obtain placement on the most desirable or top listing, the second highest bid may obtain placement on the second most desirable placement, and so on.

Figure 4:
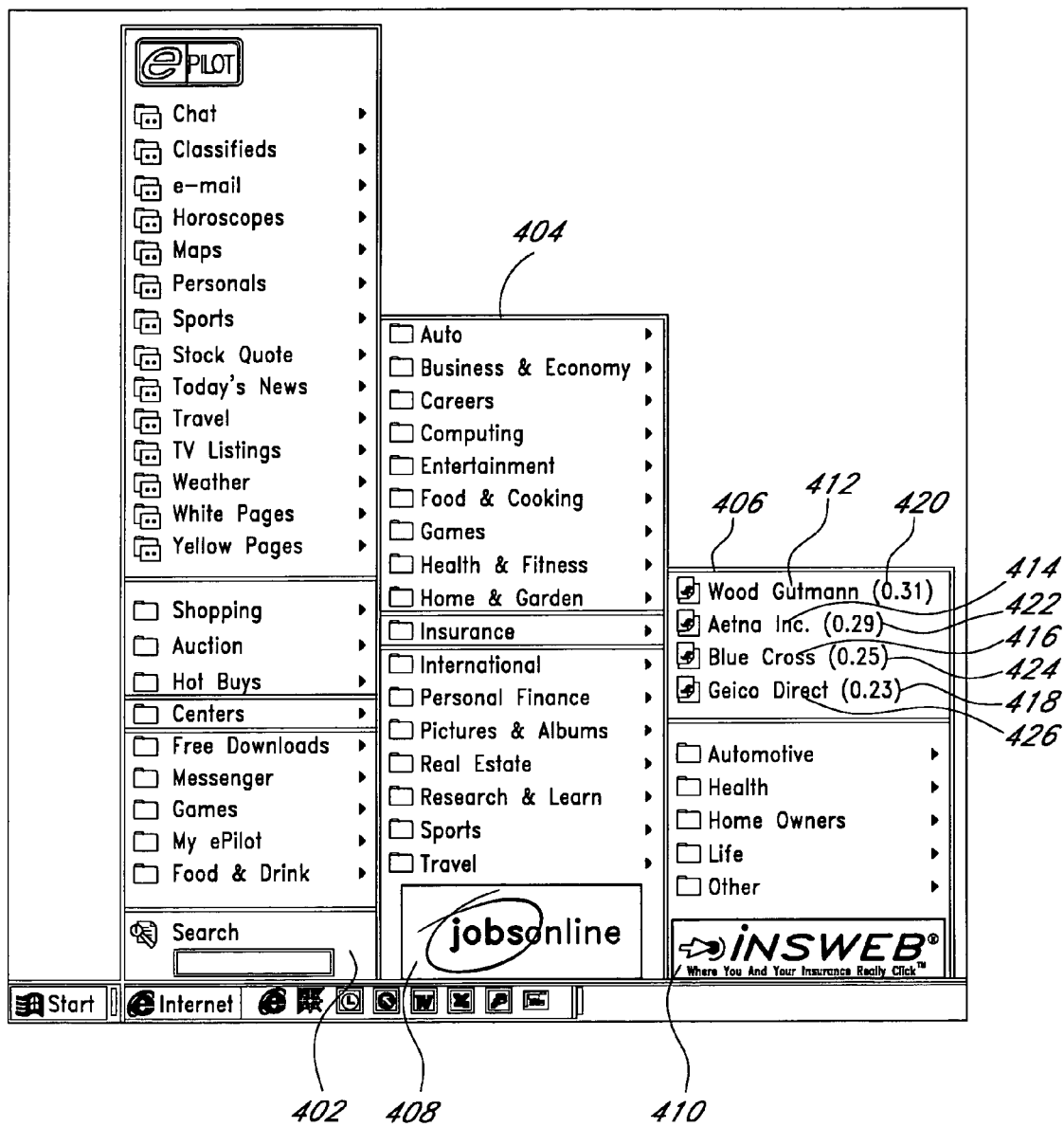
FIG. 4 illustrates one embodiment of a cascading commerce menu with paid placements.

FIG. 4 illustrates one exemplary menu 400 with advertisements 408, 410 and paid for link positioning 412, 414, 416, 418. Thus, the "jobsonline" and "insweb" are paid for advertisements 408, 410 placed on menus related to the subject matter of the advertisement. The advertisements 408, 410 also act as links to the respective advertisers' sites. The pay-for-placements hyperlinks 412, 414, 416, 418 can also include the amount paid 420, 422, 424, 426, respectively, for the placement for each click, i.e., can include an indication of a credit or micro-credit to be earned by a consumer who clicks on the link.

One or more spaces can be reserved in each menu level for one or more pay-for-placements hyperlinks, which may directly link the consumer to the advertiser's site. In one embodiment, the placement system is a real-time competitive auction system.

FIG. 5 illustrates an exemplary online bid form 500 or screen provided by a commerce server. The bid form 500 can be used by an advertiser to apply for advertising or pay-for-placements hyperlinks that can be placed on the cascading commerce menu. Where several advertisers vie for a reserved space, the bid form 500 allows a bidding advertiser to submit a bid for the reserved space.

In one embodiment, the advertiser selects the menu or submenu for the reserved space by using a menu system similar to the menu systems described in connection with FIGS. 1, 2, and 4. The menu system guides the advertiser to the desired category of information. The advertiser can enter the advertiser's URL in the URL field 502.

The bid form 500, which may include one or more pages, can further list the price being paid 510 by existing advertisers for placement on the menu 506 or submenu 508 associated with the desired category. The bidding advertiser can thereby identify the rate that the current or previous advertiser paid for a given placement position on the menu or submenu and use the information to decide how much to bid in response. The advertiser may then enter the bid into the bid form in a bid field 504. In one embodiment, a bid is posted to the commerce server. The bid can be in the form of a formatted text message and can include delimiters to indicate the start of fields in a form. It will be understood by one of ordinary skill in the art that a text messages can conform to a variety of messaging standards, and can include a message formatted in Hyper Text Markup Language (HTML). When received by the commerce server, the commerce server can strip or parse the message in accordance with the delimiters and parsing rules, and the commerce server can store the contents of the fields in a database.

Once the bid is submitted, the bid is activated and can affect the future positioning of the advertiser links on the menu. The menu is updated automatically on the client-side by the client application to reflect the new positioning when a consumer or other user next accesses the commerce site.

By way of example, in one embodiment, the bid can correspond to a fee paid for each click on the advertiser's link. In another embodiment, the fee may be a rate associated with a time period, such as a daily rate.

Figure 6:
FIG. 6 illustrates one embodiment of an advertiser registration form.

FIG. 6 illustrates a contact form 600 that can be used to receive contact information for the advertiser. The contact form 600 can include fields for a contact name, company name, phone number, and the like as shown in FIG. 6.

Figure 7:
FIG. 7 illustrates one embodiment of a payment form.

In one embodiment, the advertiser can specify a specific budget for the desired advertising. FIG. 7 illustrates one embodiment of a budget form 700, which may be used by an advertiser to select the budget for the advertisement and the method of payment. The budgeted amount 702 may be paid for by the advertiser and deposited into an account associated with the advertisement placement. The account amount can be charged against the account in accordance with the agreed upon bid rates. For example, if the bid corresponds to a fee for each click on the advertiser's link, then each time a consumer clicks on the advertiser's link, the bid amount is automatically deducted from the account. Once the balance reaches a predetermined amount, such as zero, the advertiser's pay-for-placement hyperlink is automatically removed from the client menus and is updated on a client computer on a subsequent logon by the client.

Figure 8:
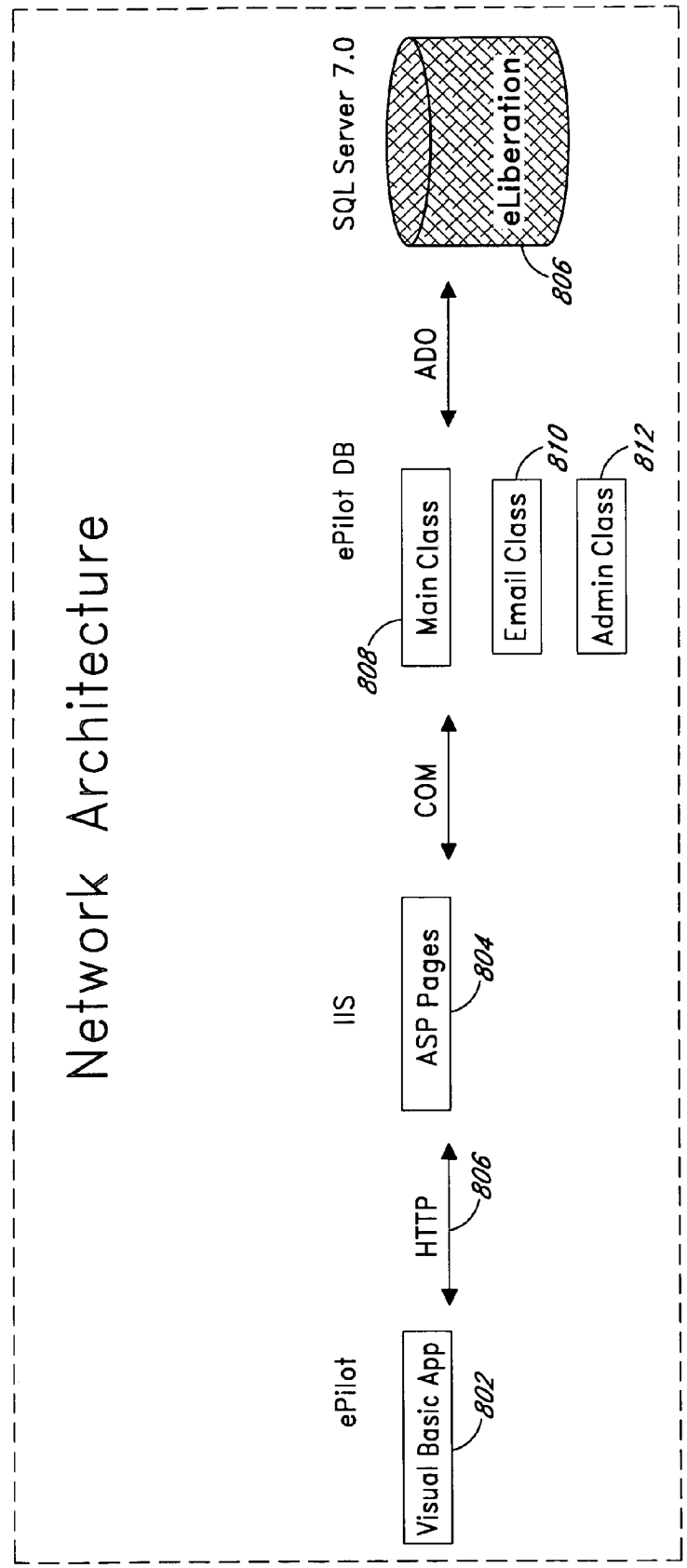
FIG. 8 illustrates one embodiment of an architecture useable with one embodiment of the present invention.

FIG. 8 illustrates an exemplary network architecture 800, which may be used with one embodiment of the present invention. The client-side application 802 or menu, is implemented with Visual Basic. The client-side application 802 is linked to a commerce server 804 over a network 806, such as the Internet. The network can conform to a variety of standard communication protocols such as TCP/IP, HTTP, FTP, and Gopher. The commerce server 804 or Internet Information Server (IIS) hosts the commerce site and provides the client with active server pages (ASP). The client can view a web page provided by the commerce server 804 by using, for example, a standard browser such as Microsoft® Internet Explorer®.

The commerce server 804 communicates to an SQL server 806 via a set of classes 808, 810, 812. The classes can conform to a component object model (COM) to standardize access to the classes. An activex data object (ADO) interface can be used to maintain the data in the SQL server 806.

Figure 9:
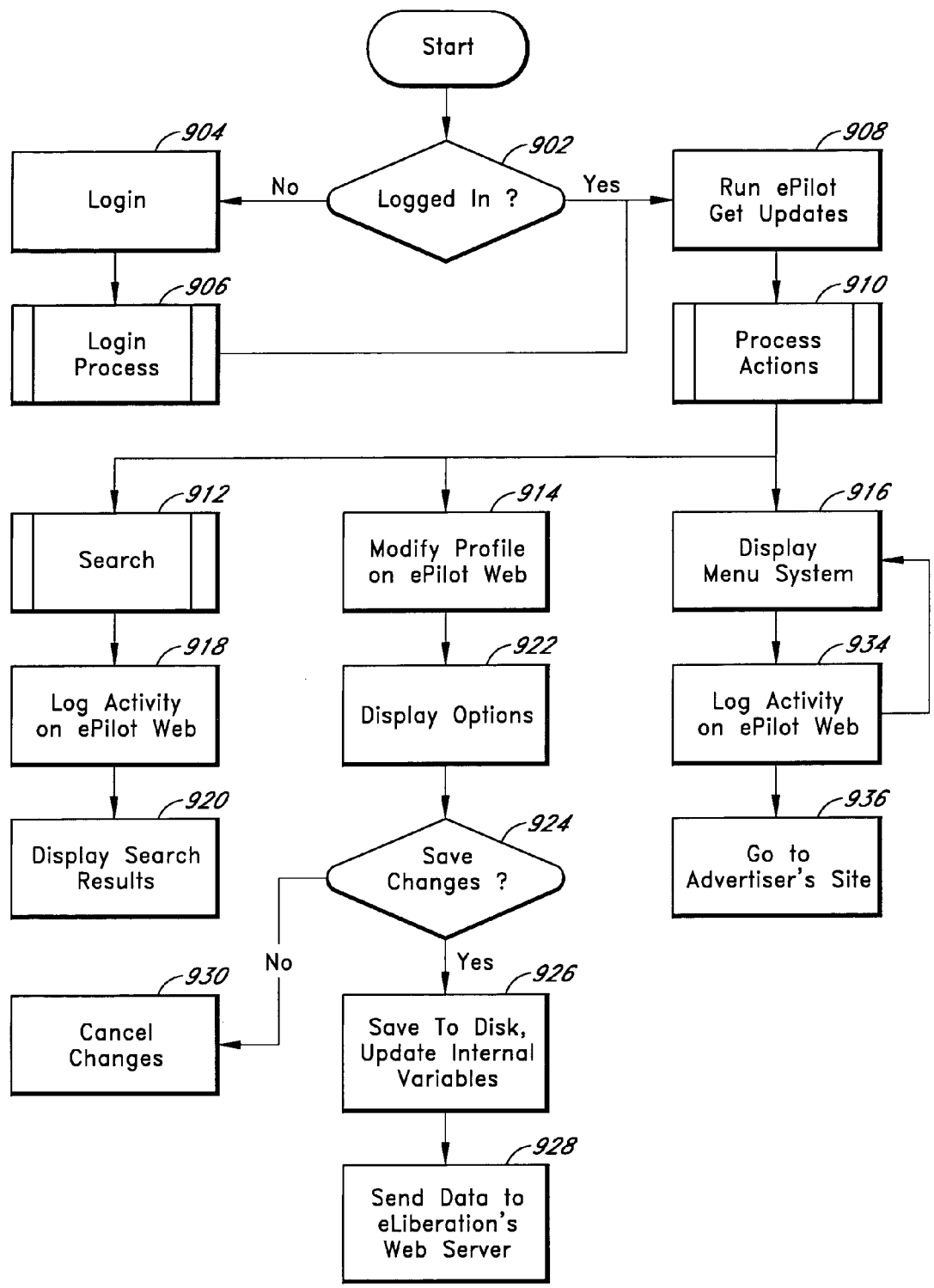
FIG. 9 illustrates a top-level flow according to an embodiment of the invention.

FIG. 9 illustrates a top-level flow 900 according to an embodiment of the invention. State 902 determines whether a user has logged on to one system known as ePilot. The system interacts with the user to receive a username, to receive a password, and to verify the status of an account as indicated by states 904 and 906. The user logs on so that the relevant account balance can be matched to the user. In one embodiment, the user does not have to logon, but in doing so, does not accumulate credit or micro-credit.

In state 908, the system delivers an update to the commerce menu. In one embodiment, the commerce menu is dynamically generated from text and only the changes and updates to the text are downloaded from the commerce system to the client's system. Downloading of only an updated portion advantageously allows the menu to be updated in less time than downloading the entire text that defines a cascading commerce menu.

In state 910, the user selects among several process actions. The user can perform a search, state 912, can modify the user's profile on the system, state 914, can display the cascading commerce menu, state 916, and so on. The user can manipulate the search results or the process can return to state 910.

Upon activation of a search in state 912, the system can log the activity as indicated by state 918 and display search results, state 920. In one embodiment, the user earns credit or micro-credit for executing searches.

Upon activation of state 914, the system can provide the user with a web page that allows the user to make changes to the user's profile, state 922. The web page can, for example, allow the user to change the user's address, which can then affect future rankings of products based on aggregate pricing. Buttons on the web page can allow a user to save changes or to cancel changes.

Where the user has elected to save changes, the process advances to state 926 and state 928. States 926 and 928 allow the changes to be applied to the commerce server and to the local computer that the user is making. In one embodiment, where the user's profile is stored only on the commerce server, the changes are made only to the commerce server. Where the user has elected to cancel changes, the process advances to state 930, which can provide the user with another web page indicating that no changes were made to the user's profile. Following state 928 or state 930, the process can return to state 910.

In state 916, the system displays a cascading commerce menu. State 916 can be activated, for example, by clicking on an icon in a toolbar as described in connection with FIG. 12. The user can interact with the cascading commerce menu to select a menu item, state 932. In one embodiment, the user is awarded with credit or micro-credit for selecting a menu item. The selection can be logged by the system, state 934, which can also update the user's account balance. In state 936, the system displays the site associated with the menu item.

Figure 10:
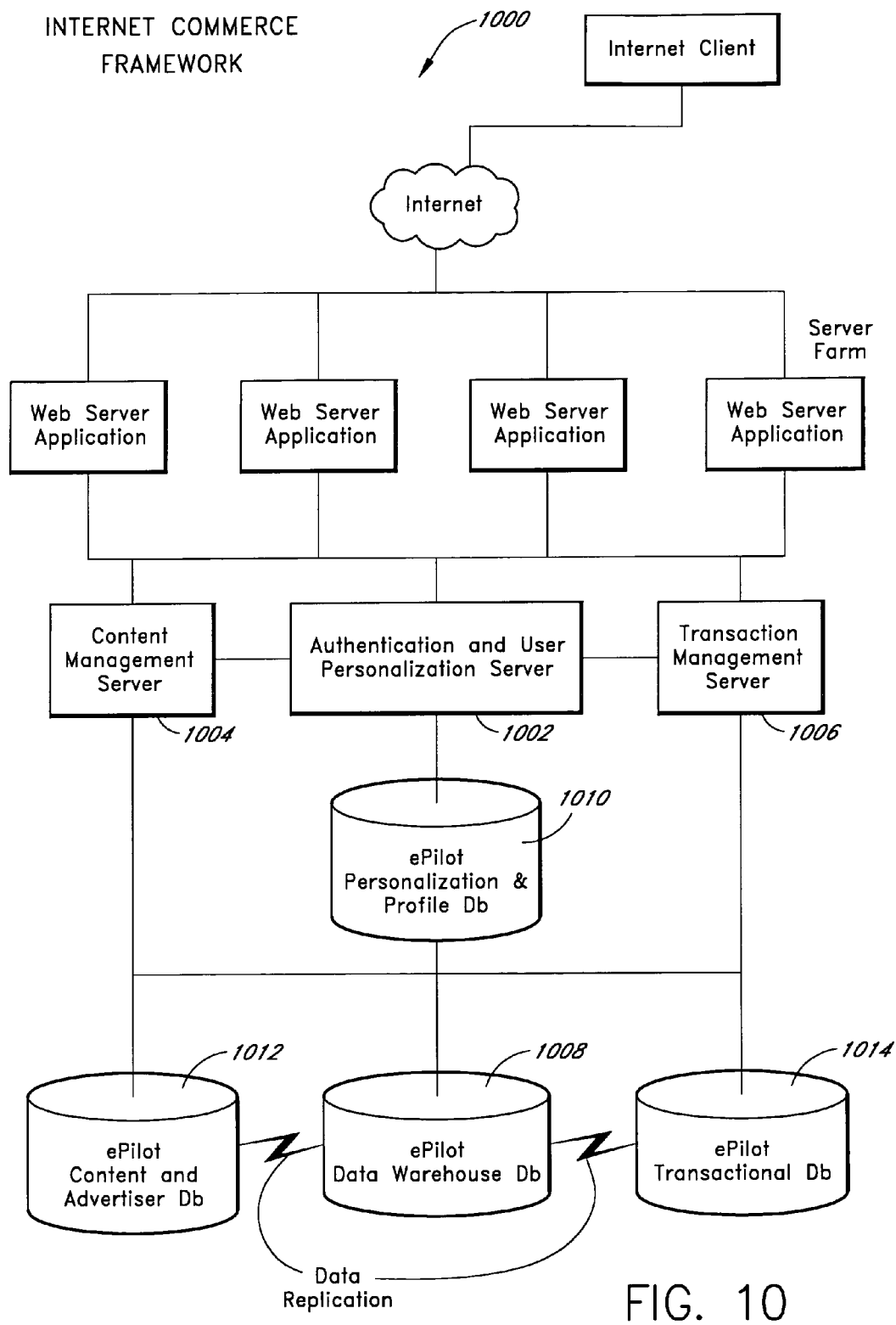
FIG. 10 illustrates a sample system architecture that can be used to implement an embodiment of the invention.

FIG. 10 illustrates one sample system architecture, termed an Internet Commerce Framework 1000, that can be used to implement an embodiment of the invention. It will be understood by one of ordinary skill in the art an embodiment of the present invention can be practiced in many alternative configurations of servers and databases and the configuration of the server is not important with respect to the present invention.

The Internet Commerce Framework 1000 combines a personalization system, e.g., user information, preferences, and account data, with an online transaction tracking and double entry accounting system. The configuration of the Internet Commerce Framework 1000 allows a commerce server to automatically and efficiently credit and debit user and advertiser/vendor accounts in small denominations, such as cents.

In one embodiment, the configuration of the Internet Commerce Framework 1000 also allows the commerce server to track an account balance so that an advertiser, as well as a consumer, can earn credit or micro-credit through the pay-per-click model and use apply the credit it towards payouts and purchases. For example, an advertiser can maintain a commerce server and earn credit through click-through advertisements sponsored by other vendors. The advertiser can then apply the earned credit toward the advertiser's own advertisements on other commerce servers and menu systems. The system can also allow revenue sharing where a single revenue source is divided among several participants in differing percentages. Such multiple party revenue sharing provides a multilevel payout arrangement for multilevel marketing or daisy-chain reselling.

One embodiment of the cascadable commerce menu allows a user to configure the menu to the user's preferences. An authentication and user personalization server 1002 allows the user to store the user's preferences remotely such that the user's preferences can be downloaded to another computer.

In one embodiment, a single "entity class" defines an element in the personalization server 1002 that encompasses all entities that access the commerce system, e.g., users, referrers, advertisers, and administration. A field in a record that corresponds to an entity can further include a reference to a related entity, such as between sister corporations or between a parent and a child corporation. The fields indicating a relationship can be used to track referring sources as encountered in multilevel marketing or daisy-chain reselling. A single entity class further allows the commerce system to use a common login screen, despite the disparity among the users.

A content management server 1004 manages content, such as advertisements and menu items, in content and advertiser database, 1012. It will be understood by one of ordinary skill in the art that a database can be implemented in one computer system or in multiple interconnected computer systems. In one embodiment, a single content class is used to store data, even where the content is disparate in type. For example, the content can include a single URL string, a complex HTML Document, or a digitized media file. The content class supports parent/child relationships to accommodate the varying content types and can further advantageously support content types that have yet to be encountered. The content class permits the designation of multiple owners to a content and allows tracking of ownership of content. The content class further permits the tracking of sources of click-throughs across multiple systems.

A transaction management server 1006 interfaces with a transactional database 1014 to monitor transactions such as user transactions and advertiser/vendor transactions. Of course, the transaction management server 1006 can be implemented by a single server or multiple servers. Where micro-credits are used, the transactions can be numerous and of low value. In one embodiment, the transactional database 1014 uses one transaction class to store a history of a transaction, regardless of the type of transaction involved.

Maintaining the transactions in a single class in the transactional database 1014 allows relatively simple access to account information, and the like, in an encapsulated e-commerce environment. In one embodiment, the transaction management server 1006 defines and separates functional responsibilities. For example, one portion of the server can open new records of transactions, while another portion can move records to a temporary holding area for pre-processing. In a pre-processing stage, the portion of the transaction management server 1006 can add indexes to the transaction records to speed other processing steps, such as a settlement of an overall transaction. In one embodiment, a relatively high-speed multi-processor computer can search, pre-process, and updates records, while a relatively slow and inexpensive computer can open new records in the transactional database 1014.

The Data Warehouse 1008 is a data store of collected data. The collected data can include a user's personal data, a user's preferences, and a log of a user's activities. In one embodiment, the log of the user's activities is not collected on a per transaction basis, but rather, as aggregate trends. The trends collected can indicate how long the user typically reads through a menu before selecting a menu item, how long the user typically views a display of goods, and the like. The collected data can later be analyzed by vendors to evaluate the effectiveness of their advertisements and the value of their advertisements. The Data Warehouse 1008 can also be implemented by a single server or by multiple servers.

A personalization and profile database 1010 can be used to store preferences and a user's profile, e.g., a user's favorite music type or favorite food.

Figure 11:
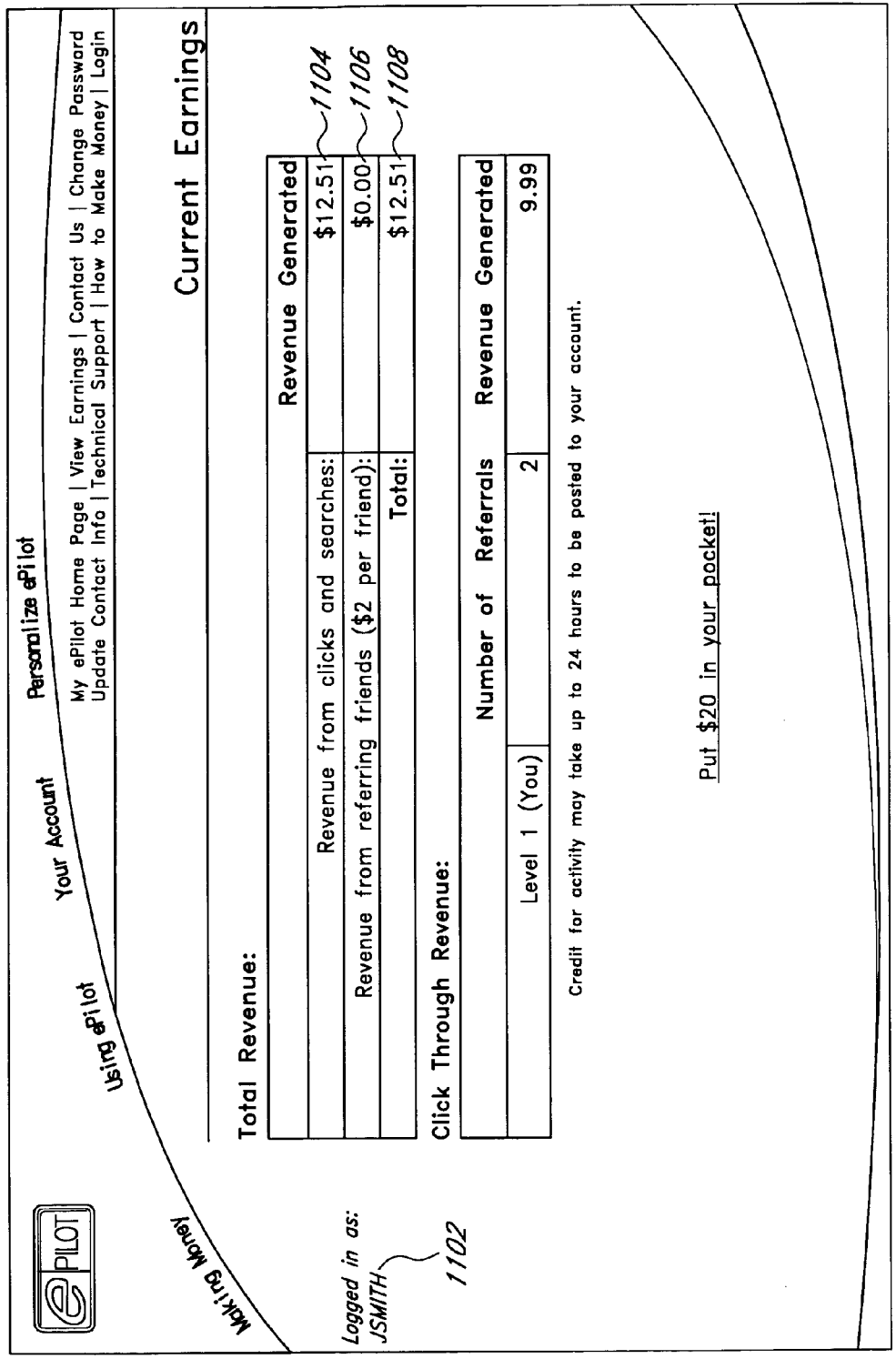
FIG. 11 illustrates a sample display that indicates micro-credit.

FIG. 11 illustrates a sample display 1100 that provides an indication of micro-credit accumulated by a consumer. The sample display 1100 as shown in FIG. 11 is a customized or personalized web page for user jsmith, as identified in a name field 1102. A first credit field 1104 can indicate an amount of credit or micro-credit that the user has accumulated through click throughs and searches. A second credit field 1106 can indicate a credit received by referring a friend to the commerce server. A third credit field 1108 can indicate a cumulative credit available for the user to spend. When the user spends credit on items or services, the credit fields can be appropriately updated to reflect the new amount of credit.

Figure 12:
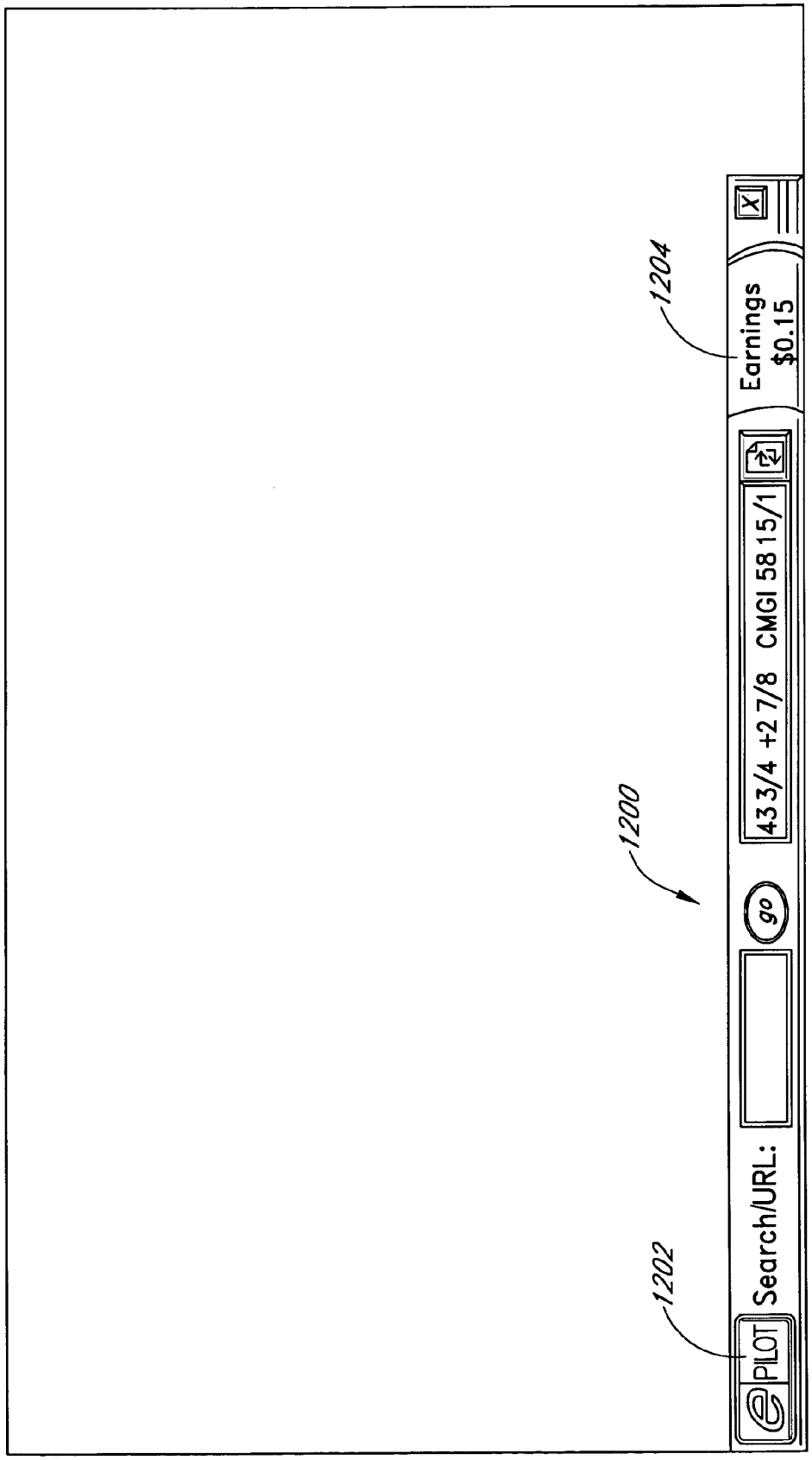
FIG. 12 illustrates a sample toolbar.

FIG. 12 illustrates a sample toolbar 1200. The sample toolbar 1200 can include a start button 1202 to activate a cascading commerce menu. The sample toolbar 1200 can further include an earnings field 1204 to indicate an amount of credit or micro-credit accumulated by the user.

Figure 13:
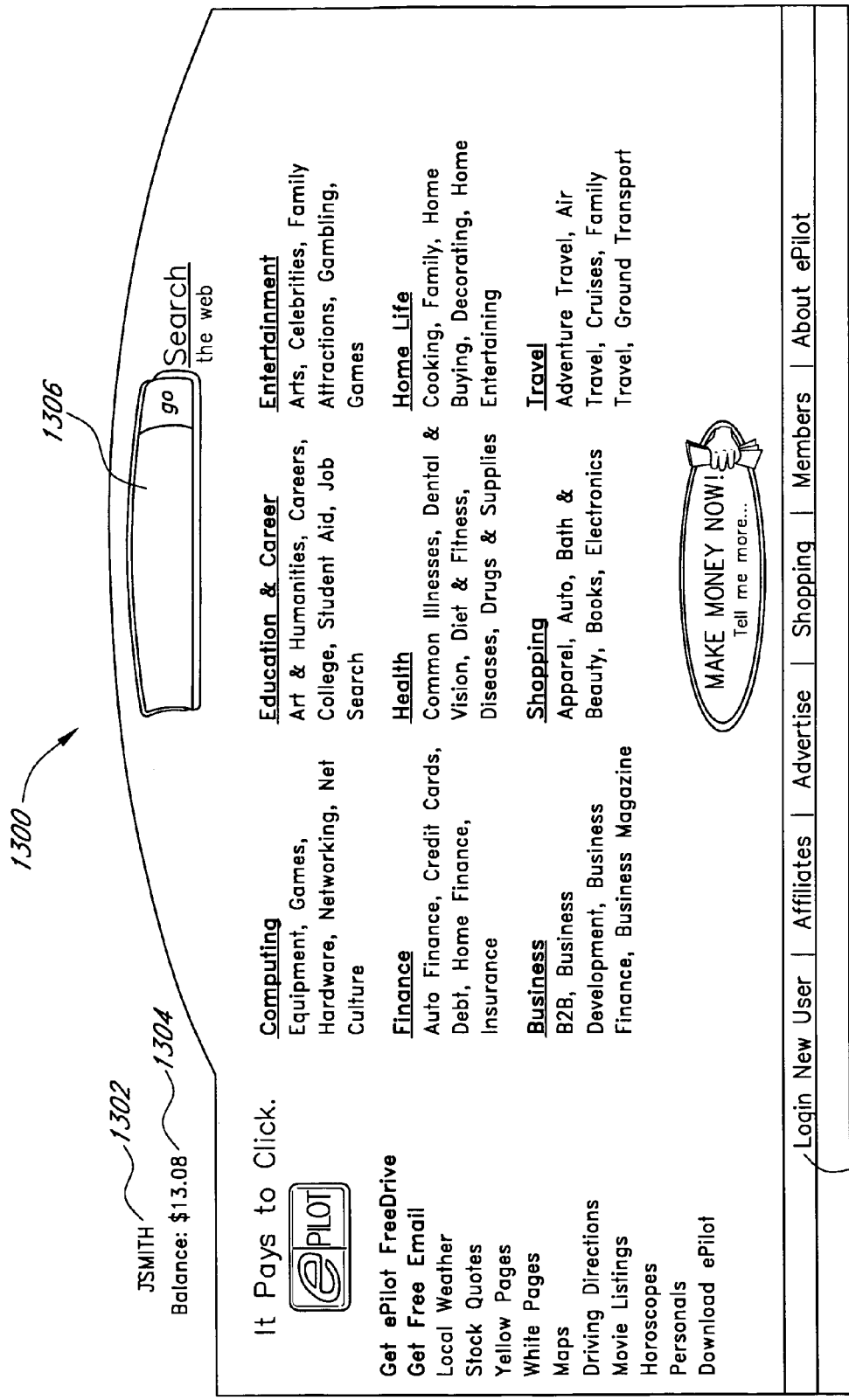
FIG. 13 illustrates a sample web page.

FIG. 13 illustrates a sample web page 1300 that is one example of a user's personalized homepage. The sample web page 1300 can include a username field 1302 and can indicate a credit or micro-credit balance 1304. The sample web page 1300 can further allow a search term to be entered in a search field 1306, which can in turn provide the user with credit. A login hyperlink 1308 allows a new user to log into the system.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A method of providing access to information relating to a plurality of products using a cascading commerce menu, comprising:

providing a first level menu listing a first set of product categories;

detecting a position of a cursor over a first product category listed in said first set of product categories;

providing a cascading second level menu listing a first set of product subcategories related to said first product category in response to said detection of said cursor position, and automatically generating a search string based on said first product category and said first product subcategory.

2. The method as defined in claim 1, further comprising providing a display of a plurality of products from multiple vendors, where the plurality correspond to the search string.

3. A method of providing access to information relating to a plurality of products using a cascading commerce menu, comprising:

providing a first level menu listing a first set of product categories;

detecting a position of a cursor over a first product category listed in said first set of product categories;

providing a cascading second level menu listing a first set of product subcategories related to said first product category in response to said detection of said cursor position; and ranking providers based on an aggregate price of an item available from the providers wherein the item corresponds to the first product category and the first product subcategory, the method comprising:

receiving a first item price for said item from a first provider;

receiving a first additional cost associated with providing the item by said first provider to a first consumer;

receiving a second item price for said item from a second provider; receiving a second additional cost associated with providing the item by said second provider to said first consumer; and ranking said first provider and said second provider based on at least said first item price, said second item price, said first additional cost, and said second additional cost.

4. The method as defined in claim 3, wherein said first additional cost is a shipping cost associated with the provision of said item from said first provider, and said second additional cost is a shipping cost associated with the provision of said item from said second provider.

5. The method as defined in claim 3, wherein said first additional cost is a tax associated with the provision of said item from said first provider, and said second additional cost is a tax associated with the provision of said item from said second provider.

6. The method as defined in claim 3, wherein said first additional cost is an insurance cost associated with the provision of said item from said first provider, and said second additional cost is an insurance cost associated with the provision of said item from said second provider.

7. The method as defined in claim 3, wherein an addition of said second item price and said second additional cost is lower than an addition of said first item price and said first additional cost, and where said second provider is ranked higher than said first provider.

8. The method as defined in claim 7, further comprising receiving a bid from said first provider to lower at least one of said item price and said first additional cost to thereby improve the first provider's ranking.

9. A method of providing access to information relating to a plurality of products using a cascading commerce menu, comprising:

providing a first level menu including a set of high-level product categories; detecting a customer selection of a high-level product category from said set of high-level product categories;

providing a cascading second level menu including a set of relatively narrower product categories related to said high-level product category in response to said customer selection;

detecting a customer selection of a relatively narrower product category from said set of relatively narrower product categories;

automatically generating a search request based at least in part on said customer selection of said relatively narrower product category; and providing the customer with information on products related to said selected relatively narrower product category at least partly in response to said search request.

10. The method as defined in claim 9, further comprising providing the customer a reward at least partly in response to using the cascading commerce menu.

11. The method as defined in claim 10, wherein the reward is a credit.

12. The method as defined in claim 9, further comprising providing the customer a reward in response to the customer purchasing at least one product associated with the selected relatively narrower product category.

13. The method as defined in claim 9, further comprising providing an advertisement on at least one of said first level menu and said cascading second level menu.

14. The method as defined in claim 9, wherein said information on products includes a ranked list of said products.

15. The method as defined in claim 14, wherein the ranking is modified based at least in part on a bid from at least a first provider of one of said products in the ranked list.

* * * * *

UNITED STATES PATENT AND TRADEMARK OFFICE
CERTIFICATE OF CORRECTION

PATENT NO.        : 7,062,453 B1                                     Page 1 of 1
APPLICATION NO.   : 09/653095
DATED             : June 13, 2006
INVENTOR(S)       : Heath B. Clarke It is certified that error appears in the above-identified patent and that said Letters Patent is hereby corrected as shown below:

In FIG. 8, change the reference numeral of the SQL server on the far right side from "806" to --816--.
In col. 1, line 42, replace "show" with the word --slow--.
In col. 9, beginning at line 23, insert after the word "with" and before the word "advertisements": --search entry box 402, menu levels 404 and 406,--.
In col. 10, line 49, replace "server 806" with --server 816--.
In col. 10, line 52, replace "server 806" with --server 816--.
In col. 11, line 20, insert the reference numeral --924-- after the words "save changes".
In col. 11, line 35, delete the words ", state 932".

Signed and Sealed this

Twenty-seventh Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,062,453 B1 | Page 1 of 1 |
| APPLICATION NO. | : 09/653095 | |
| DATED | : June 13, 2006 | |
| INVENTOR(S) | : Heath B. Clarke | |

It is certified that error appears in the above-identified patent and that said Letters Patent is hereby corrected as shown below:

Claim 1, Column 13, line 59, "and said first product subcategory" should read -- and a first product subcategory --

Signed and Sealed this
First Day of May, 2012

David J. Kappos
*Director of the United States Patent and Trademark Office*

UNITED STATES PATENT AND TRADEMARK OFFICE
Certificate

Patent No. 7,062,453 B1                                                     Patented: June 13, 2006

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Heath B. Clarke, Corona Del Mar, CA (US); David Holmes, Denver, CO (US); and Theodore Tanner, Denver, CO (US).

Signed and Sealed this Eleventh Day of November 2014.

JEFFREY A. SMITH
                                                                     *Supervisory Patent Examiner*
                                                                                Art Unit 3625
                                                                       Technology Center 3600